United States Patent [19]

Shimizu et al.

[11] Patent Number: 5,402,287
[45] Date of Patent: * Mar. 28, 1995

[54] RESOLUTION ENHANCEMENT OF ABSOLUTE TRACK POSITION USING ITERATIVE PROCESS AND POSITION BURSTS

[75] Inventors: Ryosuke Shimizu, Yawata; Tetsurou Takaoka, Uwajima; Tsukasa Yoshiura, Katano; Noriaki Wakabayashi, Hirakata, all of Japan

[73] Assignee: Matsushita Electric Industrial Co., Ltd., Kadoma, Japan

[*] Notice: The portion of the term of this patent subsequent to Aug. 2, 2012 has been disclaimed.

[21] Appl. No.: 732,207

[22] Filed: Jul. 18, 1991

Related U.S. Application Data

[63] Continuation-in-part of Ser. No. 657,779, Feb. 21, 1991, Pat. No. 5,335,123.

[30] Foreign Application Priority Data

Jul. 20, 1990 [JP] Japan .................................. 2-193637

[51] Int. Cl.⁶ ............................................. G11B 5/596
[52] U.S. Cl. ............................... 360/78.14; 360/78.04
[58] Field of Search .............. 360/78.14, 78.06, 77.08, 360/78.04

[56] References Cited

U.S. PATENT DOCUMENTS

| | | | |
|---|---|---|---|
| 4,032,984 | 6/1977 | Kaser et al. | 360/77.08 |
| 4,530,019 | 4/1985 | Penniman | 360/77.08 |
| 4,631,606 | 12/1986 | Sugaya | 360/77.08 |
| 5,021,898 | 6/1991 | Sakai et al. | 360/78.04 |
| 5,170,299 | 12/1992 | Moon | 360/77.08 |

FOREIGN PATENT DOCUMENTS 58-10787 2/1983 Japan.

Primary Examiner—Aristotelis Psitos
Assistant Examiner—James T. Wilson
Attorney, Agent, or Firm—Cushman, Darby & Cushman

[57] ABSTRACT

In the head positioning apparatus of a disk-shaped information recording medium using the sector-servo-method, track codes are recorded in advance so as to be repeated every 12 tracks in the servo sectors of the disk-shaped information recording medium, the track are reproduced with a head, and a distance between the current position of the head and a target track is detected from the reproduced signal of the track codes with a resolution of $\frac{1}{7}$ of track width, then the head is moved to the target track so as to decrease the distance, when the head reaches the range of the width of $\pm 6$ tracks of the target track, an expanded head position signal having the resolution of $\frac{1}{7}$ is generated, and the head is controlled on the basis of the expanded head position signal and is finally settled to the target track.

3 Claims, 10 Drawing Sheets

RESOLUTION ENHANCEMENT OF ABSOLUTE TRACK POSITION USING ITERATIVE PROCESS AND POSITION BURSTS

This is a continuation-in-part of application No. 07/657,779, filed Feb. 21, 1991, and entitled APPARATUS AND METHOD FOR RECOGNIZING HEAD POSITION INFORMATION, AND APPARATUS AND METHOD FOR HEAD POSITIONING, now U.S. Pat. No. 5,335,123.

FIELD OF THE INVENTION AND RELATED ART STATEMENT

1. Field of the Invention

The present invention relates to a method and an apparatus for generating a head positioning signal, and to an apparatus for head positioning that are necessary when a head is moved to an arbitrary track containing information on a rotatable recording medium.

2. Description of the Related Art

Heretofore, in a magnetic disk apparatus, servo-control scheme using servo plane or area has been employed widely wherein, a head can achieve the positioning action toward the destination data track, by being guided by servo information written in over the whole plane of a recording medium.

In this scheme, however, the positioning of the head is performed on the assumption that the relation between the servo plane and the data plane is definitive and reliable one. Consequently, there has been a drawback that off-tracks were apt to happen due to various circumstantial variations such as temperature change inside the apparatus housing and hence it was substantially difficult to attain a high packing track density.

Then, in recent years, much attention has been given on the data-plane servo schemes in that the servo information was written over the data plane and thereby the reliability at the time of recording-reproduction action was improved.

As one of those schemes, the sector-servo scheme has been proposed. In this scheme, at every leading part of respective sector, positioning servo sector has been (i.e. preliminarily written in) buried in. Then, when an arbitrary data track is selected, a head is servo-tracked to a destination track based on the servo information of the servo sectors. However, in this scheme, only the information necessary for tracking control is provided. Therefore, it was a drawback that, in order to let the head moves radically at high velocity, an extra positioning detector besides a head must be provided, or head position information must be supplied from the servo plane. Also, when it is intended to obtain sufficient position information to obtain even at the time of high velocity access only by the servo information of the servo sector, the ratio of occupation from servo sectors in the area of a recording medium necessarily increases. This induces a problem of resultant reduction of an available memory capacity in a given recording medium.

Then, it is proposed to code and record the track numbers within the servo sectors to perform the head access action basing on these recorded informations (Japanese published unexamined patent application=Tokkai Sho 51-131607). In this scheme, by obtaining discretely the position information (address information) of the track over which the head passes during the time of its seek action, average velocity between sectors is obtained, and by comparing this with an instructed velocity, the velocity control is accomplished. Thus this scheme is simple in its mechanics and has good cost performance even in case of having small number of laminated recording media, and hence it is widely being used.

However, the above-mentioned scheme in which the track numbers are recorded by coding them in the servo-sectors on the recording medium plane (The Tokkai Sho 51-131607), there was a problem that only one code is allotted to each data track. Therefore, the resolution of the track position information obtainable from each servo sector is as large as one-track width at maximum. Therefore, the error in detection of velocity, i.e., velocity detection error $\Delta V$ can be expressed by $$\Delta V = \frac{Xtp}{Ts}$$

where $Xtp$ is the track pitch and $Ts$ is the time necessary for passing one servo sector pitch. $\Delta V$ is in a range of $\pm(5-10)$ cm/s. Generally, In the transient state switching from the seek action to the tracking control action, in order to make a stable radial moving and handing, a sufficient control of the moving velocity of a head to 1-3 cm/s is necessary. However, under the situation that the velocity detection error is existing as much as several cm/s, sufficient control of the moving velocity control is difficult. Additionally, when the head rushes to a target track, a dynamic range (a moving distance of a head corresponding to a variable range of a signal level applied to the head driving device in seek operation of a target track) based on a positional signal is $\pm \frac{1}{2}$ track width at largest. Therefore, in order to surely introduce the head in the target track, a rush velocity of the head is limited to a relatively lower value. As a result, a considerable time is required until reaching a final settling position. In case that the velocity is too fast, seek error takes place and happens to give a fatal damage. That is, accuracy of the head position detection at the time of seek action and the dynamic range of the positional signal in trace and control have been problems to be attacked for improving the total performance of the head positioning apparatus.

For the above-mentioned coding of the track number, as the recording density on a recording medium has been improved, the number of the information tracks also increases, and hence a large area becomes necessary. That is, the ratio of occupation of servo region with respect to the data region on a recording medium increases, hence giving rise a problem that the maintaining of a large capacity is becoming difficult.

SUMMARY AND OBJECT OF THE INVENTION

An object of the present invention is to provide a head positioning signal generating method and an apparatus therefor for accessing the head on a disk-shaped information recording medium with a high speed and a high precision.

The head positioning signal generating method in accordance with the present invention uses the following steps servo patterns are discretely formed in circular direction of a rotatable recording medium. The servo pattern has at least two sub-servo-patterns having the periodic interval of the width of M tracks (M is an integer of 2 or more), peak values of reproduced signal amplitudes of the above-mentioned respective sub-servo-patterns are compared respectively thereby to form a first binary-valued information.

Subsequently, a first offset is added onto, at least, one of those peak values of the aforementioned reproduced signal amplitude in compliance with a value of the first binary-valued Information, then comparing respective peak values to each other again thereby to form a second binary-valued information.

A second offset is added onto a peak value on which the first offset was added in compliance with a value of the second binary-valued Information, or further adding a different offset from the first offset onto a peak value on which no offset was added at the time when second binary-valued information was produced, then comparing respective peak values to each other again, thereby to form a third binary-valued information.

Then the above-mentioned steps are repeated at least N times (N is an integer), thereby to recognize the head position in the radial direction of a recording medium up to a precision of $1/(2^N)$ of the information track width.

A head positioning signal is generated in compliance with a distance from a head to a target track for positioning said head to the target track, and an expanded position signal is generated having a dynamic range of the interval of the width of the tracks in periodic interval of said M tracks.

The head positioning signal generating apparatus in accordance with the present invention has head position information recognition apparatus comprising:

at least two peak holders for holding peak values of reproduced signal amplitudes of respective sub-servo-patterns having a periodic interval of the width of M tracks (M is an Integer of 2 or more) formed in a servo pattern formed discretely In the circular direction of a rotatable recording medium, at least one comparator for comparing the at least two peak values, a first latch for memorizing the output of the comparator, thereby to hold a first binary-valued information, an offset decoder for determining to which peak holder an offset is to be added in compliance with the contents of said first latch, an offset-adder for adding an offset to a specified peak holder In compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using the comparator again, N latches for latching N binary-valued informations from 1st to N-th binary-valued information, and a head position information discrimination element for detecting the relative position relation of a head with respect to tracks with a precision up to $1/(2^N)$ of the information track width by using contents of the from the 1st latch to the N-th latch, and a central processing means ($\mu$CPU) for generating an expanded position signal having a dynamic range of the interval of the width of M tracks in periodic interval of said M tracks, by computing a relative distance in radial direction of a rotatable recording medium between a head and a predetermined track up to a precision of $1/(2^N)$ of a track width.

By the head positioning signal generating method and apparatus in accordance with the present invention, the servo patterns are discretely formed on the tracks of the recording medium. Then, at least two sub-servo-patterns of M tracks (M is integer of 2 or more) are set in the servo patterns. The sub-servo-pattern has an interval of width of M tracks. The position of the head with respect to a track is detected with an accuracy of $1/(2^N)$ of a track width, by generating a head positioning signal of the dynamic range of the width of M tracks. Consequently, even if the head rushes to a target track with a high speed, the head is stably positioned to the target track, and high speed and high reliability seek operation is realizable.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

In the following, explanation is given with reference to the accompanying drawings on a head positioning signal generating method and apparatus thereof as well as a head positioning apparatus as preferred embodiments of the present invention.

Figure 1:
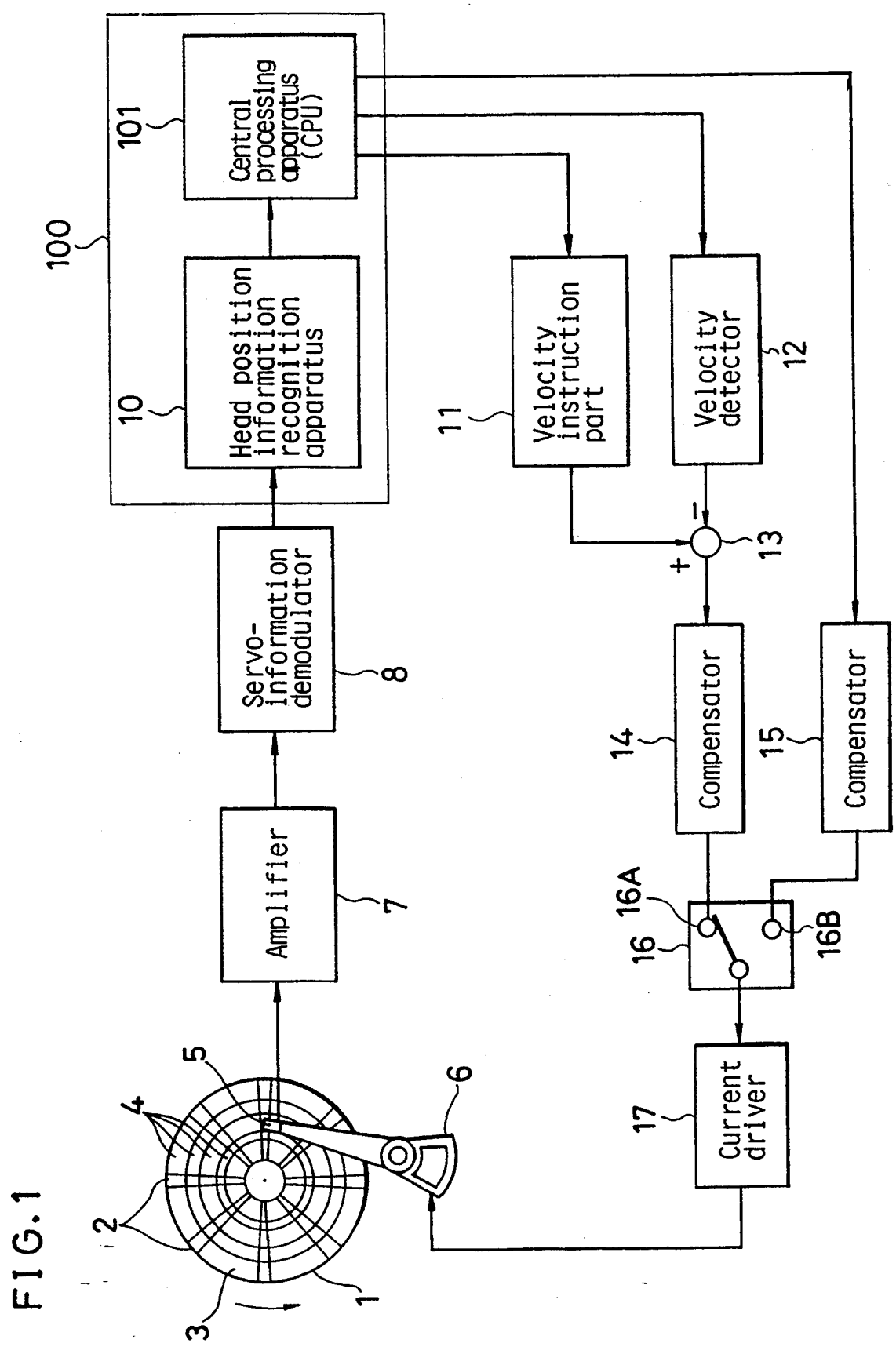
FIG. 1 is a block diagram of a fundamental embodiment of a head positioning apparatus in one embodiment of the present invention.

FIG. 1 is a block diagram of a fundamental embodiment of a head positioning apparatus as the preferred embodiment of the present invention. As shown in figure, a rotatable recording medium 1 such as a magnetic hard or flexible disk which is to be revolved by a known spindle motor (not shown in the figure) has a number of discrete servo sectors 2,2 . . . for recording the servo informations. The information or data of the servo sectors 2 are buried beforehand (or preliminarily recorded) sporadically with a predetermined pitch in a manner to be read by a head 5 which runs in the circular direction on the information track on the recording medium plane. Data sectors 3,3 . . . are disposed between said servo sectors 2,2 . . . for recording data to be recorded thereon. Information tracks 4,4 . . . are provided in the data sectors on the recording medium plane. The information of the data sectors 3,3 can be written in and read out from the information tracks through the head. A VCM (voice coil motor) positioner 6 is provided in a manner to make necessary moving (accessing) of the head 5 to a selected information track by moving the head 5 radically of the recording disk 1. An amplifier 7 amplifies signals reproduced by the head 5. A servo information demodulator 8 receives reproduced signals from the amplifier 7 and detects servo sectors 2, 2 . . . which are placed discretely on a recording medium 1, thereby to extract only the servo information and outputs it.

A head position information recognition apparatus 10 recognizes and discriminates the relative position of the head 5 with respect to the information tracks 4,4, . . . with a precision of $1/(2)^N$ of the track width, by using at least two servo patterns formed in the servo sector as will be described later.

A head positioning signal generating apparatus 100 calculates a distance in a radial direction of the recording medium between a track decided arbitrary and the head with the resolution of $1/(2^N)$ of the track width, by using the output of the head position information recognition means 10 and a central processing unit ($\mu$CPU) 101, and generates a head positioning signal having a dynamic range of the width of M tracks and a periodic interval of the width of M tracks. A velocity instruction part 11 instructs a target velocity, corresponding to the distance to a selected destination track or the number of tracks to cross over to reach the destination track, at the time of the track access control for accessing or transferring the head to the selected information track. Ordinarily, the velocity Instruction part 11 is realized with a ROM table or the like. But the velocity instruction part 11 may be such one that, an arithmetic processing on the measured data is made by using a function which is prescribed in the instruction part 11, thereby to issue output, every time the distance to the destination track or the number of tracks to cross over to reach the destination track is measured.

A velocity detector 12 performs arithmetic processing every time when the head 5 passes a servo sector 2 by receiving as its input head position information of high resolution from the head position recognition apparatus 10, to output radial moving velocity of the head in the radial direction of the recording medium. For the velocity detector 12, at the time of performing the velocity detection, not only output from the above-mentioned head position information recognition apparatus 10, but current flowing in the VCM positioner 6 may also be used in addition to the above-mentioned output.

An error amplifier 13 is for performing an error calculation between the outputs of the above-mentioned velocity instruction part 11 and the velocity detector 12. The output of this error amplifier 13 is supplied through a compensator 14 and a switch 16 to a current driver 17, which supplies the current to the VCM positioner 6 responding to the output of the compensator 14, and thus a track access control loop is constituted. The tracking control loop which makes the head 5 track a selected information track is constituted by supplying the output of the head positioning signal generating apparatus 100 to the current driver 17 through the compensator 15 and the switch 16.

Figure 2:
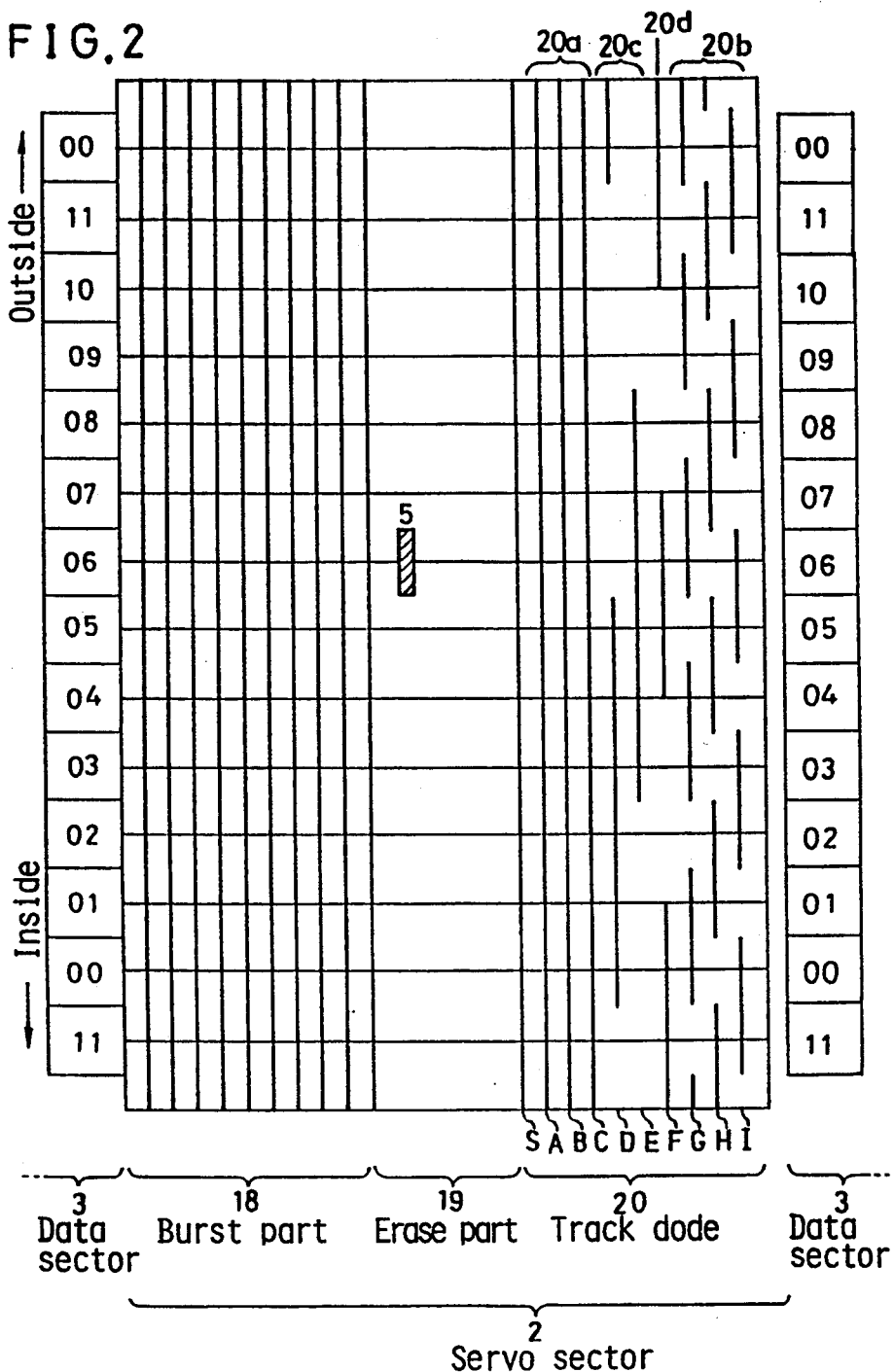
FIG. 2 is a pattern diagram of an actual example of discrete servo sectors burled beforehand in the information track on a rotatable recording medium in one embodiment of the present invention shown in FIG. 1.

FIG. 2 is an actual example (of servo pattern) of the circularly discrete servo sectors 2 buried beforehand in the information tracks 4 on a rotatable recording medium in one embodiment of the present invention shown in FIG. 1. In the figure, numeral 3 represents a data sector. This servo sector 2 comprises: a burst part 18, an erase part 19 for detecting the servo sector, and a track code part 20 for acquiring the track address information. The erase part 19 is taken so as to give a maximum erasing time on the information tracks of the recording medium 1. Writing in on the servo sector is prohibited.

The above-mentioned track code part 20 comprises by burying therein a synchronization bit (hereinafter: sync bit) S, a zone discrimination part 20a, a second servo pattern 20c, a third servo pattern 20d and a first servo pattern 20b. The sync bit part S is for indicating the end of the DC erase part and the beginning of the track code part 20. The zone discrimination part 20a comprises three dibit patterns A, B, and C and is for discriminating between the guard zone and the data zone and the sorts of data zones. The first servo pattern 20b comprises a three-phase dibit patterns G, H, and I each having a period of as much as three tracks. The second servo pattern 20c comprises two dibit patterns D and E each having a period of as much as 12 tracks and a shift of 3 tracks therebetween. The third servo pattern 20d comprises a dibit pattern F having a period of as much as 6 tracks and a shift of at least of 1.5 tracks from the second servo pattern 20c.

Apart from the case of FIG. 2, wherein the second servo pattern 20c having two dibit patterns and the third servo pattern 20d are placed on one side of the first servo pattern 20b, another mode may be embodied such that the second servo pattern comprising two dibit patterns are separated and placed respectively on both sides of the first servo pattern. It is further possible to place the second servo pattern on one side of the first servo pattern and place the third servo pattern on another side of the first servo pattern. Furthermore, it is also possible to place each of the second servo pattern and the third servo pattern alternately with respect to the first servo pattern comprising three dibit patterns. At the time of record and reproduction to and from the data track through the head 5, the head 5 runs across successive two tracks of the servo sector 2.

Figure 3:
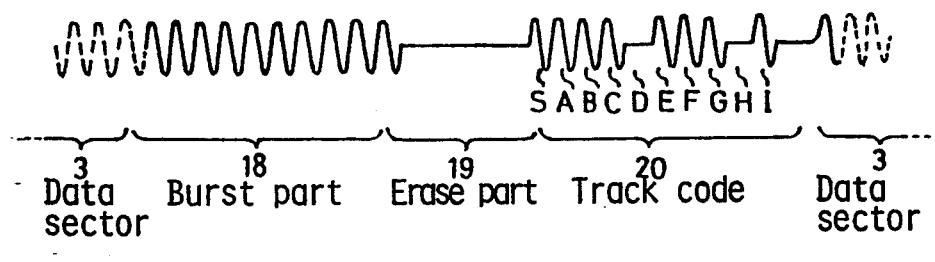
FIG. 3 is a reproduced waveform chart at the time when a head radially moves-the servo sectors as has been shown in FIG. 2.

Now, assuming that the head 5 is at the sixth track of a recording medium 1, waveform reproduced from the head 5 becomes as shown In FIG. 3. That is, in the burst part 18 a specified reference signal is reproduced. In the erase part 19, no signal is reproduced. And in the track code part 20, the following signals are reproduced corresponding to respective servo patterns respectively: at the sync bit position S, at the zone discrimination positions A, B, and C, at the second servo pattern positions D and E, at the third servo pattern position F, and at the first servo pattern positions G, H, and I. In FIG. 3, reproduced signal becomes as follows: at the positions S, A, B, C, E, F, G, and I, output becomes 1; at the positions D and H, output becomes 0. It is needless to mention that the above-mentioned reproduced signal changes depending upon the track position on a recording medium on which the head 5 is present.

In the present Invention, according to the first to the third servo patterns 20b, 20c, 20d which were obtained as has been described above, the track position of the head 5 with respect to the recording medium is detected with a high precision. Then, toward the destination track thus selected, the seek action is performed to achieve the head positioning action.

Figure 4:
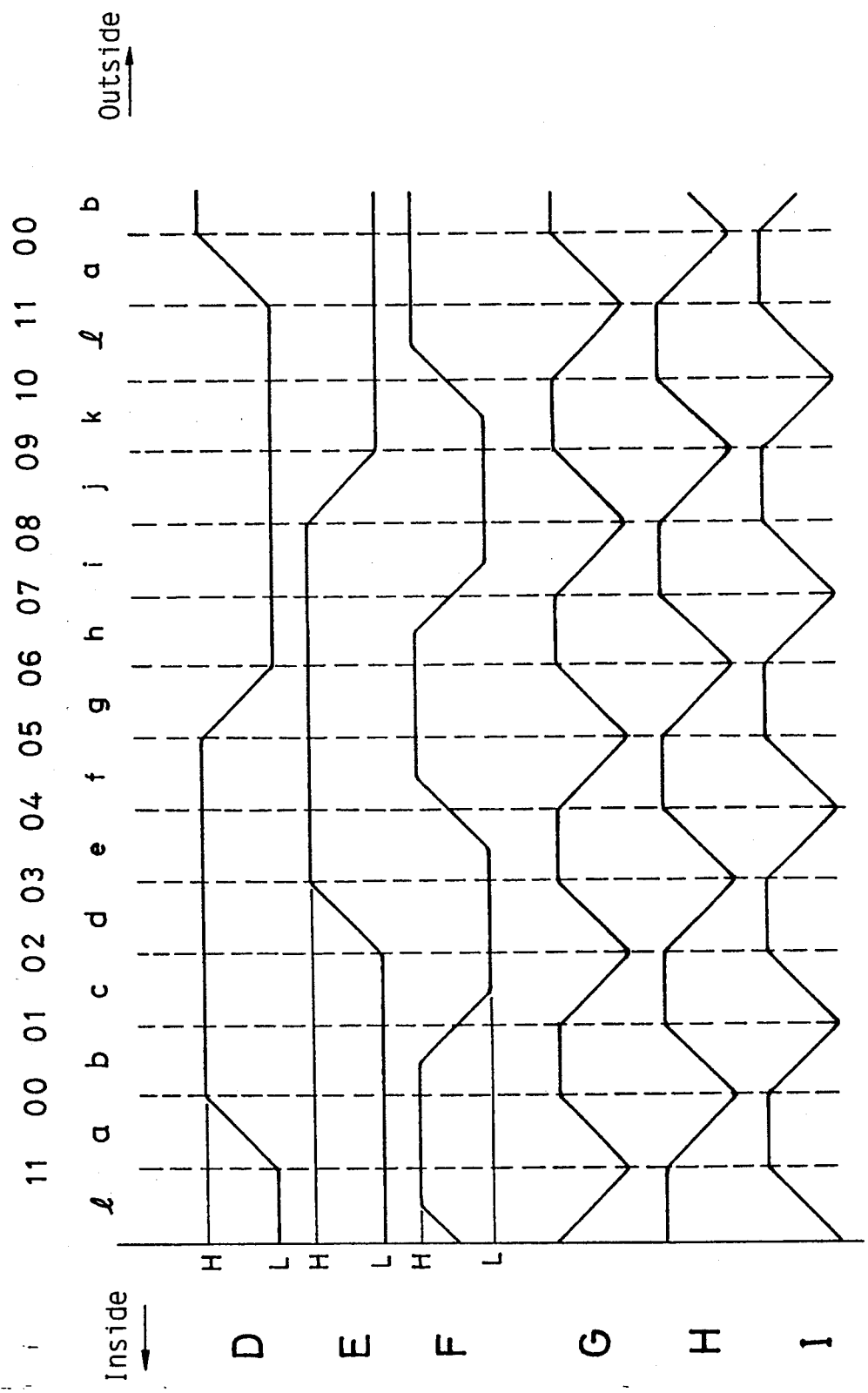
FIG. 4 is a reproduced output state timing chart showing an ideal reproducing state at the time when the head is let to moves radially in a slow velocity over servo sectors as shown in FIG. 2 from an inside track to an outside track of a recording medium.

FIG. 4 shows an ideal output state timing chart of a reproduced waveform at the time when the head 5 is driven to move with a slow velocity over servo sectors from an inside track to an outside track of a recording medium as shown in FIG. 2. Because the head 5 has a finite width, the slope part of respective reproduced signal in FIG. 4 is, determined by the output value responding to the occupation ratio of dibit pattern width to the head width at the point of time when the head passes respective dibit patterns. In FIG. 4, those numbers from 00 to 11 correspond to the track numbers of 12 track periods shown in the left end blocks in FIG. 2. Cyclic Alphabetical notations from a to l represent servo-track numbers of 12 track periods which are radially shifted as large as a half track width.

Hereupon, reproduced signals D, E, and F obtained from the second and the third servo patterns are processed to binary-valued signals determined by a prescribed threshold level. The reproduced signals G, H, and I obtained from the first servo pattern are peak-held and thereafter respective values are compared and converted into binary-valued information. The above-mentioned two different groups of binary-valued informations, which are obtained from a first group information D, E and F and from a second group information G, H and I of the reproduced signals of D, E, F and G, H, I, are let to be a first binary-valued information. According to values of the above-mentioned first binary-valued information, a predetermined offset is added to a signal in which the lowest value among the above-mentioned signals G, H, and I is held. Then, by performing again a next comparison of this offset value with the corresponding signal, a second binary coded information is obtained. According to the above-mentioned first binary-valued information and second binary-valued information, the position of the head 5 on the servo-track is recognized accurately up to a precision of $1/(2^2)$ of the track width.

The second servo patterns D and E have a period of 12 tracks, a mutual delay of 6 tracks, hence have a mutual overlap of 8 tracks, and produce from their reproduced signal the signal E and the signal D. Accordingly, as far as the reproduced signals are ideal, it is possible to discriminate 3 tracks out of those 12 tracks. However, since the head has a finite width, the reproduced output does not change digitally and since the reproduced waveforms are influenced by the response characteristics of the recording medium or of the head, it is difficult to discriminate digitally 3 tracks out of 12 tracks.

Then a third servo pattern having a period of 6 tracks and an overlap as much as 1.5 track width with the D pattern or the E pattern is provided. As a result, the third patterns F becomes definitely always "L" level of "H" level at the slope parts of the D signal or the E signal in the servo sector having a period of 12 tracks, binary-valued information of D signal, E signal and F signal for each track are shown in TABLE 1. Mark * indicates those regions in which the binary-valued output is not determined to the definite "L" or "H" level depending on the position of the head at the time of signal detection.

TABLE 1

| Sector | Two valued information by signals D, E and F | | |
|---|---|---|---|
| | Signal D | Signal E | Signal F |
| a | * | L | H |
| b | H | L | * |
| c | H | L | * |
| d | H | * | L |
| e | H | H | * |
| f | H | H | * |
| g | * | H | H |
| h | L | H | * |
| i | L | H | * |
| j | L | * | L |
| k | L | L | * |
| l | L | L | * |

As is understood From this TABLE 1, it is constituted such that when the level of either one of the signal D or the signal E is not determined, the level of the signal F is determined to "L" or "H". Accordingly, when the level of either two signals among signals D, E and F are detected, it can be discriminated that the head 5 is present in which 3 tracks among 12 tracks.

Figure 5:
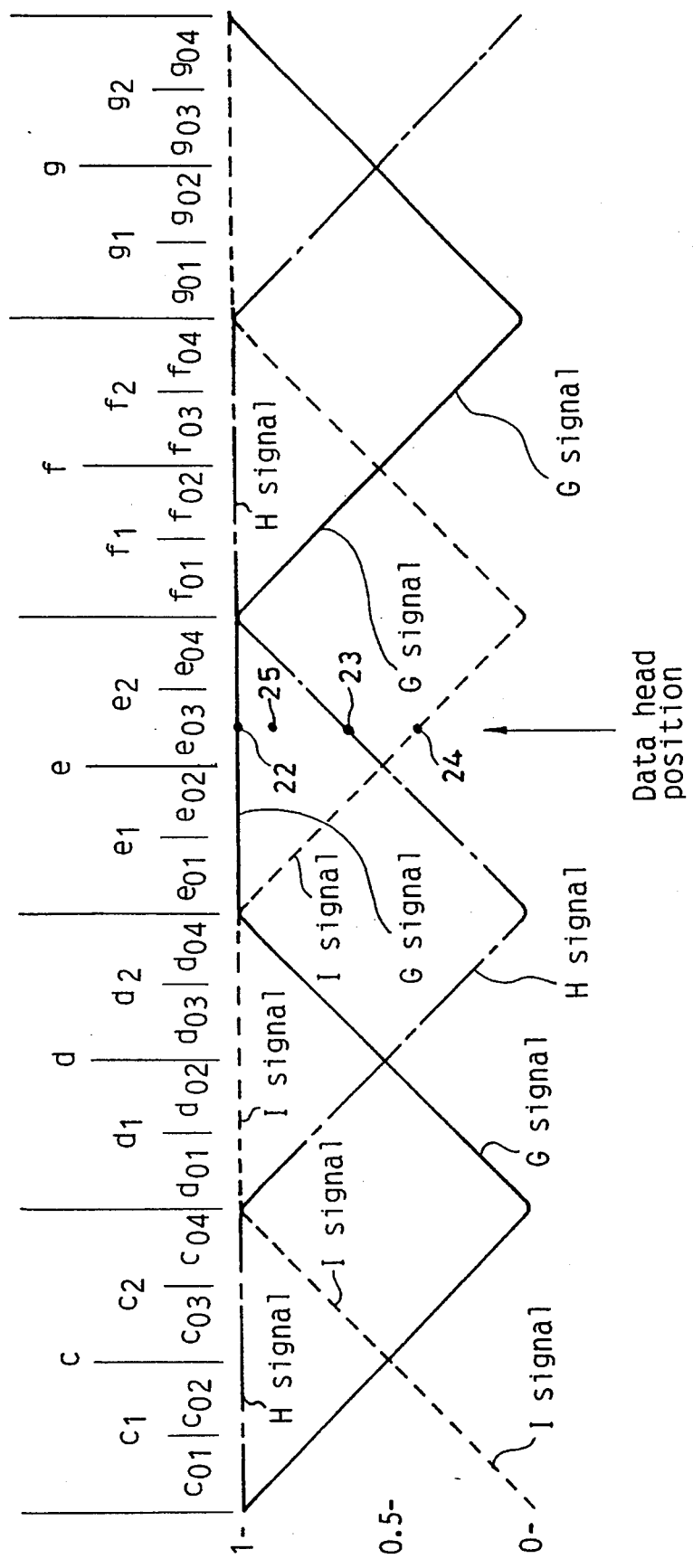
FIG. 5 is a reproduced output state timing chart showing an ideal state of the reproduced output of signal G, signal H, signal I at the time when the head is let to move in a slow velocity over servo sectors as shown in FIG. 2 from inside tracks to the outside tracks of a recording medium.

Next, from the reproduced signals G, H, and I obtained from the first servo pattern, at which position of the above-mentioned discriminated 3 track the head 5 is present is discriminated. FIG. 5 shows, likewise in FIG. 4, an ideal output state timing chart of signals G, H, and I at the time when the head is let to move with a slow velocity over servo sectors from an inside track to an outside track of a recording medium as shown in FIG. 2. In FIG. 5, in which the head 5 moves from the servo-track c to g, time variation is expanded and shown. Here, the signals G, H, and I are shown with overlapping them to each other. The peak value of the output of the signals G, H, and I are represented after normalizing them (the maximum value is taken to be 1). Now, assuming the detected codes of the signals D, E, and F to be "H" "H" "L", as is understood from TABLE 1, the head is to be present at some place on the tracks of d, e, or f in the servo sector. Assuming that the peak value of the reproduced signal from the signals G, H, and I are respectively 22, 23, and 24 as shown in FIG. 5, it is understood that value of G signal is larger than value of H signal, value of H signal is larger than value of I signal, and value of I signal is smaller than value of G signal. That is, when an examination of relations such as value of G signal > value of H signal, value of H signal > value of I signal, and
value of I signal > value of G signal
are performed, an answer as "I, H, and L", which means "TRUE, TRUE and NOT TRUE", is obtained. From this answer, respective peak values of G, H, and I are judged to be in an order of G, H, and I in their height order. As a result of this, as is understood also from FIG. 5, the head position is discriminated to be such that, from the fact that the G signal is largest, it is present In the e track among three tracks of d, e, and f, and from the fact that value of H signal > value of I signal, it is present in a region $e_2$ (shown in FIG. 5). Next, based on the first binary-valued information (D signal, E signal, F signal, G signal, H signal, and I signal are respectively "H", "L", "H", "H", and "L"), an offset is added onto the I signal which has the lowest peak value. A value of offset at the first offset-adding process is selected to be equivalent to 0.5. After adding the offset of 0.5, the peak value of I signal moves to a position in FIG. 5 from 24 to 25. Thereafter, again In case of performing the examination of value of H signal > value of I signal, its answer becomes "L" which means NOT TRUE. Among answers given by this comparison, the comparison of value of It signal > value of I signal (but, after adding the offset of 0.5) is useful for discriminating a more detailed position. That is, if the answer in the case of performing the comparison of value of H signal > value of I signal (after adding the offset of 0.5) becomes "H", it becomes that the peak value of the H signal is larger than the peak value of the I signal by more than 0.5. On the other hand, if the answer becomes "L" it becomes that the difference between the peak value of the I signal and the peak value of the I signal is to be less than 0.5. That is, the head position can be discriminated to be whether in a leading half part $e_{03}$ or in a latter half part $e_{04}$ of the above-mentioned $e_2$ region. As a result of this, it becomes that the difference between the peak value of the H signal and the peak value of the I signal is to be less than 0.5. Therefore, as is understood also from FIG. 5, the head position is discriminated as to be present at the region $e_{03}$ which is in the $e_2$ region shown in FIG. 5. As has been described above, according to the second binary-valued information, it becomes possible to discriminate accurately the relative position relation of the head with respect to the track in the servo-track with a precision up to $1/(2^2)$ of the track width.

Furthermore, an offset of −0.25 to the I signal and thereafter performing the comparison of value of H signal > value of I signal (after adding the offset of 0.5-0.2), a third binary-valued information is produced. Thereby, it becomes possible to discriminate accurately the relative position relation of the head with respect to the track in the servo-track with a precision up to $1/(2^3)$ of the track width.

As has been described above, according to the (N-1)-th (N≧2) binary-valued information, an offset expressed by $$\pm \frac{1}{2^N}$$

is added onto the G signal, H signal, or I signal. Hereupon, the double sign is determined by the (N-1)-th binary-valued information such that: when the binary-valued information is "H", the − sign must be taken, whereas when it is "L". The + sign must be taken. By adding such offset, it becomes possible to discriminate the relative position relation of the head with respect to the track in the servo-track with a precision up to $1/(2^N)$ of the track width.

Table 2 tabulates the first binary-valued information described above, that is, those information in accordance with G signal, I signal, and I signal of 3 track periods in the servo sector, and also those cases of value of G signal > value of H signal, value of H signal > value of I signal, and value of I signal > value of G signal.

TABLE 2

| The first binary-valued information using signals G, H, and I | | | |
|---|---|---|---|
| Servo-track | G>H | H>I | I>G |
| a, d | $a_1 d_1 g_1 j_1$ | L | L | H |
| g, j | $a_2 d_2 g_2 j_2$ | H | L | H |
| b, e | $b_1 e_1 h_1 k_1$ | H | L | L |
| h, k | $b_2 e_2 h_2 k_2$ | H | H | L |
| c, f | $c_1 f_1 i_1 l_1$ | L | H | L |
| i, l | $c_2 f_2 i_2 l_2$ | L | H | H |

Hereupon, alphabetical notations, (a—1), ($a_1$, $a_2$—11, 12) are the same ones as shown in FIG. 5. Since it never takes place that the binary-valued Informations becomes "H, H, and H" or "L, L, and L", they are not included in the table. Now, reference of this table is explained taking an example. Assuming that the head 5 is present at the position shown in FIG. 5, answers for the examination conditions G>H, H>I, and I>G become "H, H, and L". From TABLE 1, the head 5 is present In either one of d, e, or f within the servo sector. From TABLE 2, the head position is determined to be In the region $e_2$.

Next, In order to determine with a precision up to ¼ of the track width, the second binary-valued information is produced. For making this, to which signal the first offset is to be added is shown in TABLE 3.

TABLE 3

| Signal to which the first offset is to be added | | | |
|---|---|---|---|
| Signal to which the first offset is to be added | First binary-valued information | | |
| | G>H | H>I | I>G |
| G | L | * | H |
| H | H | L | * |
| I | * | H | L |

Among the first binary-valued informations, when G>H, H>I, and I>G are "H, H, and L", signals G, H, and I are judged to be in an order of G, H, and I in their height order. Accordingly, the signal the first offset of 0.5 is to be added is judged to be the I signal. Referring to TABLE 3, it is understood that, in case that the answer for the conditions G>H, H>I, and I>G is "*, H, and L", the signal to which the first offset to be added is the I signal. This agrees with the result described above. Therefore, by referring to TABLE 3, the signal name to which the first offset to be added can be determined. Furthermore, after adding the first offset, by repeating the comparisons examination of G>H, H>I, and I>G, the second binary-valued information is obtained. By means of the second binary Information, discrimination of the head position is achieved with a precision of $1/(2^2)$ of the track width. In TABLE 4, results of the region discrimination by the second binary-valued information are shown. Hereupon, the leftest column mark indicates the signal names to which the first offset was added, and * mark means "no need of adding the offset". In the case of the example described above, from TABLE 4, it can be discriminated that the head is present in the region $e_{03}$, because a meaningful second binary-valued information, that is, answer for the examination H>I, becomes "H".

TABLE 4

| | | Region discrimination by the second binary-coded information | | | | | | | |
|---|---|---|---|---|---|---|---|---|---|
| | | G>H | | | H>I | | | I>G | |
| G | H | $a_{02}$ | $d_{02}$ | | * | | H | $c_{04}$ | $f_{04}$ |
| | | $g_{02}$ | $j_{02}$ | | | | | $i_{04}$ | $l_{04}$ |
| | L | $a_{01}$ | $d_{01}$ | | | | L | $c_{03}$ | $f_{03}$ |
| | | $g_{01}$ | $j_{01}$ | | | | | $i_{03}$ | $l_{03}$ |
| H | H | $a_{04}$ | $d_{04}$ | H | $b_{02}$ | $e_{02}$ | | * | |
| | | $g_{04}$ | $j_{04}$ | | $h_{02}$ | $k_{02}$ | | | |
| | L | $a_{03}$ | $d_{03}$ | L | $b_{01}$ | $e_{01}$ | | | |
| | | $g_{03}$ | $j_{03}$ | | $h_{01}$ | $k_{01}$ | | | |
| I | | * | | H | $b_{04}$ | $e_{04}$ | H | $c_{02}$ | $f_{02}$ |
| | | | | | $h_{04}$ | $k_{04}$ | | $i_{02}$ | $l_{02}$ |
| | | | | L | $b_{03}$ | $e_{03}$ | L | $c_{01}$ | $f_{01}$ |
| | | | | | $h_{03}$ | $k_{03}$ | | $i_{01}$ | $l_{01}$ |

In order to discriminate the head position with a higher precision up to $1/(2^3)$ of the track width, depending upon whether the answer of the second binary-valued information is "H" or "L", necessary second process is divided into (i) an addition of an offset of 0.25 to the signal to which the first offset was added and (ii) a subtraction of the same amount of offset from the signal to which the first offset was added. Apart from the above procedure, it is also possible to add 0.25 to other member of paired signals which have been used for the comparison in order to produce the second binary-valued information. For example, in the above-mentioned example, there are two procedures; after subtracting as much as 0.25 from the peak value of the I signal to which 0.5 was added, the comparison of H>I is repeated, or after adding 0.25 to the H signal, the comparison of H>I is repeated. It can be discriminated that, when the answer is "H", the head is present at the latter half part of the region $e_{03}$, while when the answer is "L", the head is present at the leading half part of the region $e_{03}$. Thus it becomes possible to discriminate the position of the head with a precision up to $1/(2^3)$ of the track width. In any of the above-mentioned procedures, an offset of $1/(2^N)$ of the maximum value of the reproduced signals is added to such one of those reproduced signals G, H, and I that shows the lowest peak value, and then the comparison examinations of G>H, II>I, and I>G are repeated. By tills processes. the discrimination of the head position up to a precision of $1/(2^N)$ becomes possible.

Figure 6:
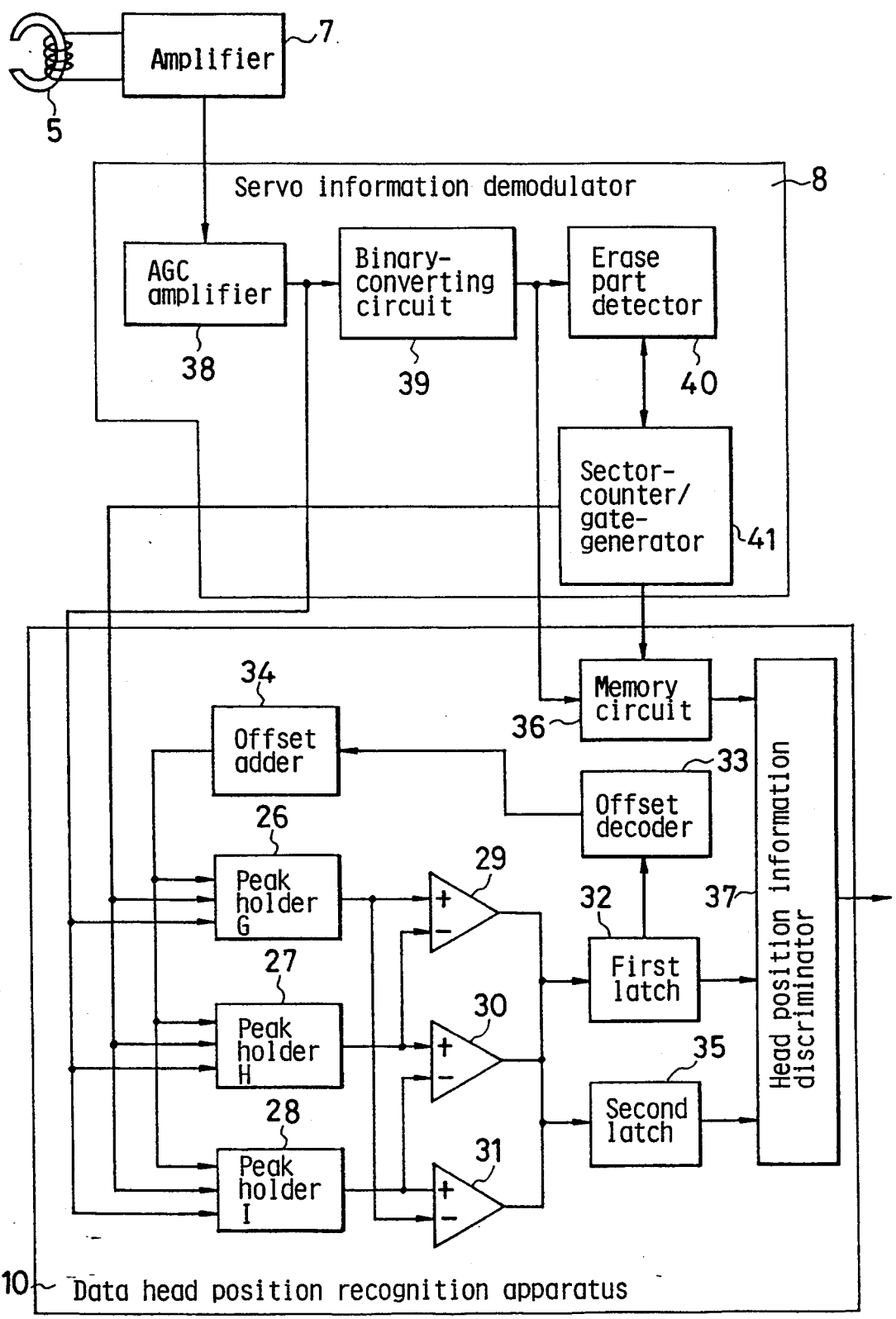
FIG. 6 is a block diagram showing further in detail a servo information demodulator (8) and a head position information recognition apparatus (10) of a head positioning apparatus in one embodiment of the present invention.

FIG. 6 is a block diagram which show one embodiment of further details of a head position information recognition apparatus 10 and a servo-information demodulator 8 of a head positioning apparatus. After detecting signals by the head 5 from the recording medium 1 the signals are is amplified by an amplifier 7, and the output thereof is supplied to an AGC amplifier 38. The AGC amplifier 38 normalized the output value using such as a burst part 18 burled in the servosector 2. A servo information demodulator 8 comprises the AGC amplifier 38, a binary-converting circuit 39 and a sector-counter/gate-generator 41. The binary-converting circuit 39 converts the signal normalized by the AGC amplifier with a prescribed threshold value, an erase part detector 40, which finds out the erase part 19 having a longest space part out of successive binary-valued signals. The sector-counter/gate-generator 41 detects the erase part 19 and at the same time lets the counter part thereof start to generate gate signal for detecting signals A to I in the track code 20 which are burled and formed in a servo sector 2; the sector-counter/gate generator 41 further generates gate signal for discriminating the next-coming servo sector from the data sector 3.

The head position information recognition apparatus 10 comprises a memory circuit 36, peak holders 26, 27 and 28 for G, H and I signals, respectively, comparators 29, 30 and 31, a first and a second latch 32 and 35, respectively, an offset adder 34, a memory 36 and a head-position-informing discriminator 37. The memory circuit 36 memorizes momentarily binary-valued information of signals A, B, C, D, E, and F out of binary-valued signals binary-converted by a binary-converting circuit 39. The peak holder G 26, the peak holder H 27, and the peak holder I 28 receive the gate instruction from the sector-counter/gate-generator 41 and hold respective peak values of the signals G, H, and I. The comparator 29 compares the peak value of the peak holder G 26 and the peak value of the peak holder H 27. The comparator 30 compares the peak value of the peak holder H 27 and the peak value of the peak holder I 28. The comparator 31 compares the peak value of the peak holder I 28 and the peak value of the peak holder G 26. The first latch 32 holds binary-valued information of the comparators 29, 30 and 31 and constitutes a first binary-valued information together with the binary-valued information of the memory 36. The offset decoder 33 determines to which peak holder among G 26, H 27, and I 28 a first offset is to be added, depending on the decoding schemes in the aforementioned TABLE 3. The offset adder 34 adds a prescribed offset value to either one of the peak holders G 26, H 27, and I 28 in compliance with the instruction of the above-mentioned offset decoder 33. The second latch 35 holds the result of comparison between the peak value of the peak holder to which an offset was added by the offset adder 34 and the peak value of the corresponding peak holder and forms a second binary-valued information. The head position information discriminator 37 discriminates the relative position of the head with respect to the servo-track by using the first binary-valued information consisting of the contents of the above-mentioned memory circuit 36 and the first latch 32 and by using the second binary-valued information consisting of the contents of the second latch 35.

By taking a constitution as has been described above, the head position information recognition apparatus 10 becomes capable of discriminating the relative position relation of the head with respect to the track in the servo-track with a precision up to $1/(2^2)$ of the track width. Accordingly, at the time of controlling the track access, it becomes possible to recognize the moving velocity of the head as precisely as four (4) times of that of prior art, thereby achieving a high accuracy velocity control of the head.

Hereupon, in the head position information discriminator 37, the position discrimination of the head using TABLE 1, TABLE 2, TABLE 3, and TABLE 4 can be made by a hardware utilizing such as ROM table, or can be made by a software utilizing such as a macro-CPU and a program.

Figure 7:
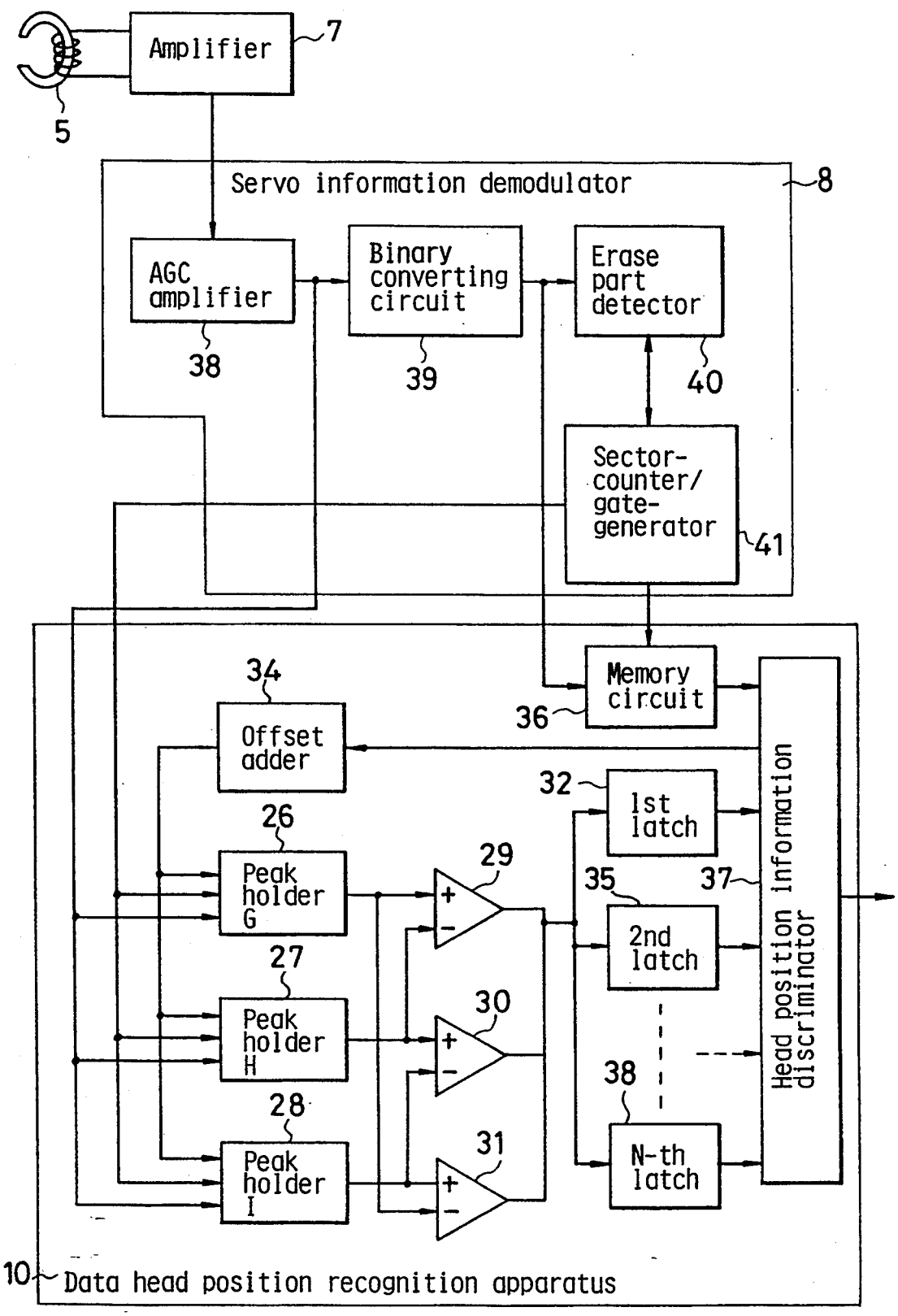
FIG. 7 is a block diagram showing in detail a servo information demodulator (8) and a head position information recognition unit (10) for a case having such a modified constitution that the position relation of the head with respect to servo tracks can be discriminated more accurately in comparison with the case of FIG. 6 up to a precision of $1/(2^N)$ of the track width.

FIG. 7 is a block diagram for a case that the constitution is devised so that the relative position of the head position information recognition apparatus 10 with respect to servo-tracks 2,2 of the data track 4 can be discriminated accurately up to a precision of $1/(2^N)$ of the track width. In the figure, those blocks having the same numerals as in FIG. 6 have the same function as those blocks in FIG. 6 have. In FIG. 7, the lead position information discriminator 37 performs the following processes: It selects a peak holder 26, 27 or 28 to which a first offset is to be added and instructs a first offset value to be added to the offset adder 34 based on a first binary-valued information formed by the memory circuit 36 and the first latch 32. Then it performs a comparison between a peak value held in the peak holder 26, 27 or 28 to which the offset was already added and a peak value of a paired peak holder, thereby to form a second binary-valued information on the second latch. Then according to the result of this second binary-valued information, the head position information discrimination element 37 selects a peak holder 26, 27 or 28 to which a second offset is to be added and Instructs a second offset value to be added to the offset adder 34. And it performs a comparison between a peak value held in the peak holder to which the offset was already added and a peak value of a paired peak holder and thereby forms a third binary-valued information on the third latch.

By further repeating the above-mentioned processes n-times, binary-valued informations of from 1st to N-th are formed on the 1st to N-th latches 32, 35, —38. As a result, by using the binary-valued informations of the 1st through the N-th latches, it becomes possible that the head position information recognition apparatus 10 discriminate the relative position relation of the head 5 with respect to the track 2 in the servo-track with a precision up to $1/(2^N)$ of the track width. Consequently, at the time of control of track trace and control of the track access, the moving velocity of the head can be recognized as precisely as $2^N$ times of that of prior art, thereby achieving a high accuracy velocity control of the head. Hereupon, although it is possible to constitute the head position information discriminator 37 by only a hardware utilizing such as ROM table, it is yet desirable to constitute it using a hardware such as one-chip micro-CPU and a software to operate it.

Figure 8:
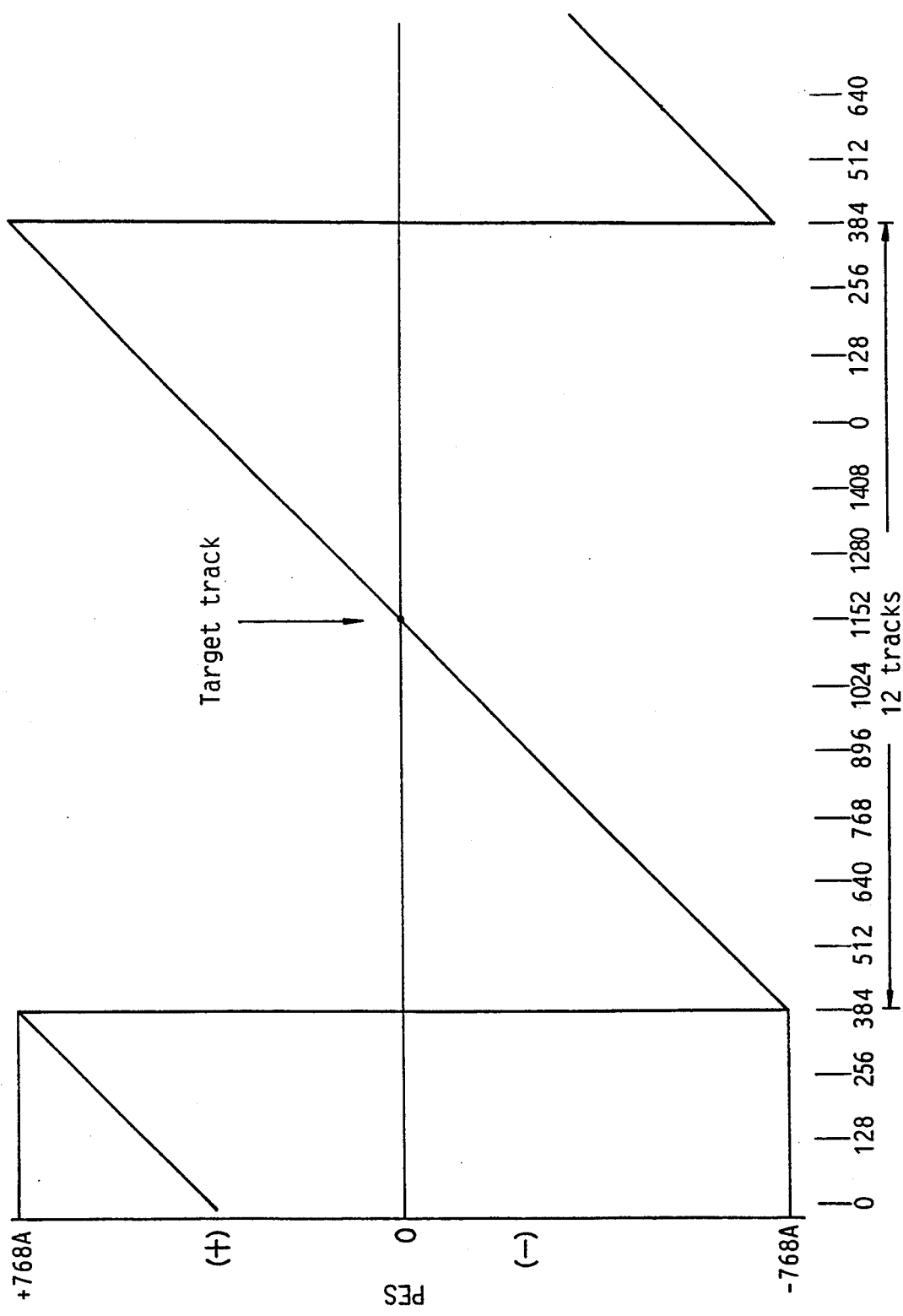
FIG. 8 is a diagram showing an expanded position signal having a periodic interval of 12 tracks.

FIG. 8 is a diagram of an "expended position signal" having a periodic interval of 12 track width (an interval of 12 times of one track pitch). The diagram is generated by the head positioning signal generating apparatus 100, which comprises the head position information recognition means 10 and a μCPO 101. The head position information recognition means 10 can detect 1st–7th binary information by the apparatus shown in FIG. 7 comprising seven latches 32–38 (N=7).

A target track is positioned at the center position of the interval of the 12 track width, and a relative position between the head and a target track is recognized with the resolution of $1/(2^7)$ of one track width. Therefore, positions in one track width are represented by range codes of 0–127 (range code: a code representing a distance), and the width of 12 tracks are represented by range codes of 0–1537. Numerals 0–127 representing the ranges in which the head is positioned correspond to the positions which divides the respective ranges $a_{01}$–$l_{04}$ in table 4 into $2^5(=32)$. The resolution of $1/(2^7)$ of the information track width in the head positional detection is generally satisfactory for tracing control purpose of the head. In the event that further improvement of the resolution is required, the configuration of the head position information recognition means 10 is improved by Increasing the number of the latches 32–38 to eight or more ($N \geq 8$).

Figure 9:
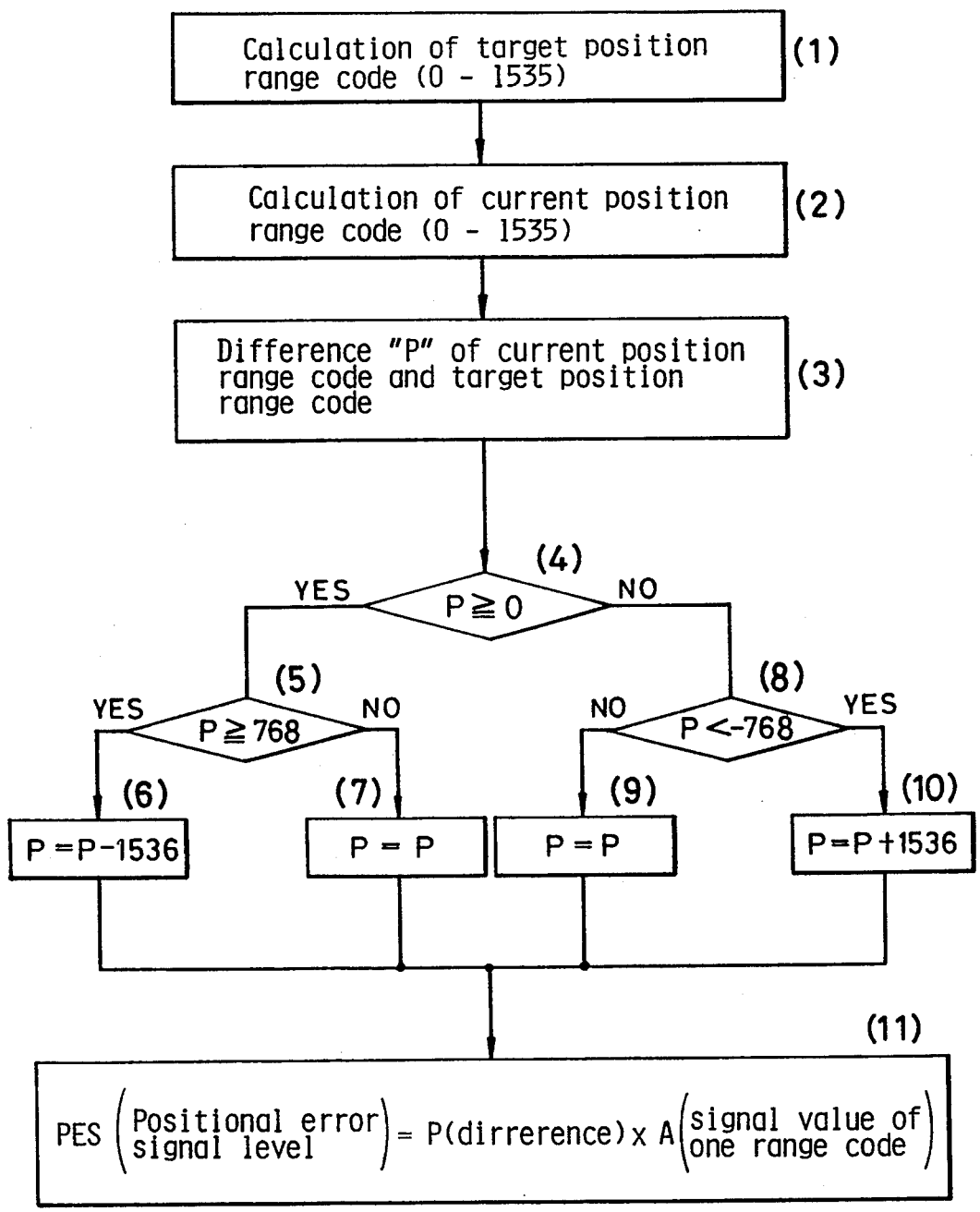
FIG. 9 is a flow-chart of a method for generating the expanded position signal as shown in FIG. 8 by using the head positional information recognition means which recognizes the relative positional relation of the head and the track with a resolution of $1/(2^7)$ of the information track width and the CPU.

FIG. 9 is a flow chart of a method for generating the expanded position signal shown in FIG. 8 by using the head position information recognition means 10 which recognizes a relative position between the head and a target track with the resolution of $1/(2^7)$ of the information track width and the CPU 101.

When 81st track of a recording medium is a target track for example, the numeral 81 is divided by 12. Consequently, the quotient is 6, and the rest is 9 ($81 \div 12 = 6 \ldots 9$). Hence, the target track position is represented by a range code 1152 in the resolution of $1/(2^7)$ of the information track width ($9 \times = 1152$). When the head 5 is present at 10th track of the recording medium at present for example, the distance from the head 5 to the target track is represented by a range code 9088 (($81 - 10) \times 128 = 9088$). The range code at the 10th track is 1280 ($10 \div 12 - 0 \ldots$, therefore $10 \times 128 = 1280$). After start of the seek action from the 10th track to the 81st track, the head 5 detects a position of a servo sector represented by the range code with the resolution of $1/(2^7)$ of the information track width; and a travel distance and a velocity are calculated on the basis of a position detected at last passing of a servo sector and a current position detected by passing of a servo sector.

For example, when the head has passed a first servo sector after start of the seek action and has detected a range code 1472, the travel distance of the head 5 is represented by a range code difference 192 ($1472 - 1280 = 192$) (hereinafter the range code difference is referred to as "P"). Therefore, the rest is a range code difference 8896 ($9088 - 192 = 8896$). Then, if the range code 192 is detected when the head has passed the subsequent servo sector, the travel distance from the prior servo sector is represented by a range code difference 256 ($1536 - 1472 + 192 = 256$). and the remaining distance to the target track is represented by a range code reference 8640 ($8896 - 256 = 8640$). In calculation of the travel distance, in the event that the range code of the current position of the head is small and the previous range code where the head has positioned is large, the travel distance is obtained by the calculation of "$1536 - (\text{previous range code}) + (\text{current range code})$".

By repeating the above-mentioned seek action, the remaining distance to the target track is gradually decreased. Then, when the remaining distance falls below the range code difference 768 (6 tracks × 128 = 768), an expanded position signal is generated from the head positional signal generating apparatus 100. In FIG. 8, when the remaining distance is less than the range code difference 768 with respect to the target track of 81st (range code 1152), if the range code of a detected servo sector is 512, a positional error signal level (hereinafter is referred to as "PES") is represented by —-640A ($512 - 1152 = -640$). (A: a signal level of 1/768 of the level of the expanded position signal). The expanded position signal having the PES of "—640A" is applied to the VCM positioner 6 through the compensator 15, the switch 16 and the current driver 17. The moving velocity of the head depends on the PES of the expanded position signal. The center of the target track (range code 1152) is made to place at the center of the expanded position signal (zero level position) shown in FIG. 8. Consequently, a signal level of the expanded position signal has a positive value In the outer part of the center of the target track and has a negative value in an inner part of the center of the target track. Therefore, when the head approaches a target track from the outer part, the expanded position signal approaches zero from a positive value +768A, and when the head approaches the target track from the inner part thereof, the expanded position signal approaches zero from a negative value −768A.

Subsequently, provided that the range code detected from the last passed servo sector is 768, the PES between the head and the target track is −384A in the expanded position signal (768−1152=−384). In the head positioning signal generating apparatus 100, when the value of PES enters in the range of ±128A of PES, it is determined that the track head 5 is present within the range of one track from the target track. Thereafter, the control mode of the head 5 is changed to the tracing control mode (position control mode) from the seek mode (velocity control mode).

When the head 5 approaches the target track from a peripheral part of the recording medium, the expanded positional signal having a positive value is generated (+768A and below). In the event that the head passes a servo sector and detects a range code 256, the PES is 640A as shown by Steps 3, 4, 8, 10 and 11 in the flow chart of FIG. 9. Thereafter then, the head is also controlled by the tracing control mode.

Function and operation of the expanded position signal is elucidated hereafter.

First, the seek operation is elucidated. When a target track is instructed in the head positioning apparatus shown in FIG. 1, a velocity instruction signal for instructing a moving velocity of the head is output from the velocity instruction part 11. The velocity instruction signal has a value corresponding to a distance between the target track and the current position of the head 5. After start of the head 5, the moving velocity of the head 5 is detected by the velocity detector 12, and a difference between the instructed velocity and the detected velocity is detected by the error amplifier 13. The output of the error amplifier 13 is applied to the VCM positioner 6 and the head 5 is moved to the target track with the instructed velocity.

A range code is detected at every passing of the servo sectors by the head 5, and the position of the head 5 is detected with the resolution of $1/(2^7)$ of the information track width by the head position information recognition apparatus 10 of the head positioning signal generating apparatus 100. Then, the travel distance of the data ahead 5 is calculated on the basis of the range code of the current position of the head and the range code of the last position of the head 5. In the head positioning signal generating apparatus 100, the travel distance represented by the range code difference is calculated by subtracting the current position of the head 5 from the travel distance calculated in advance (target track number—the track number of the current position)×128), and the rest of the distance is obtained.

When the remainder of the distance represented by a range code difference has dropped below 768, the expanded position signal of the periodic interval of 12 tracks is generated by the head positioning signal generating apparatus 100. In order to make to rush the head to the target track as fast as possible and to reduce a settling time in the tracing control mode, changeover from the velocity control mode to the tracing control mode is preferably before 2 or 3 tracks to the target track. Even if the expanded position signal is generated by the head positioning signal generating apparatus 100 when the head arrives at the position before 6 track of the target track, it is recommendable that the head is moved in the velocity control mode until before 2 or 3 tracks of the target track; and at that position, the velocity control mode is changed to the tracing control mode by switching the switch 16 to a contact 16B. After then, the head 5 is settled to the center of the target track having zero of the range code on the basis of the PES calculated in compliance with the expanded position signal.

Figure 10A:
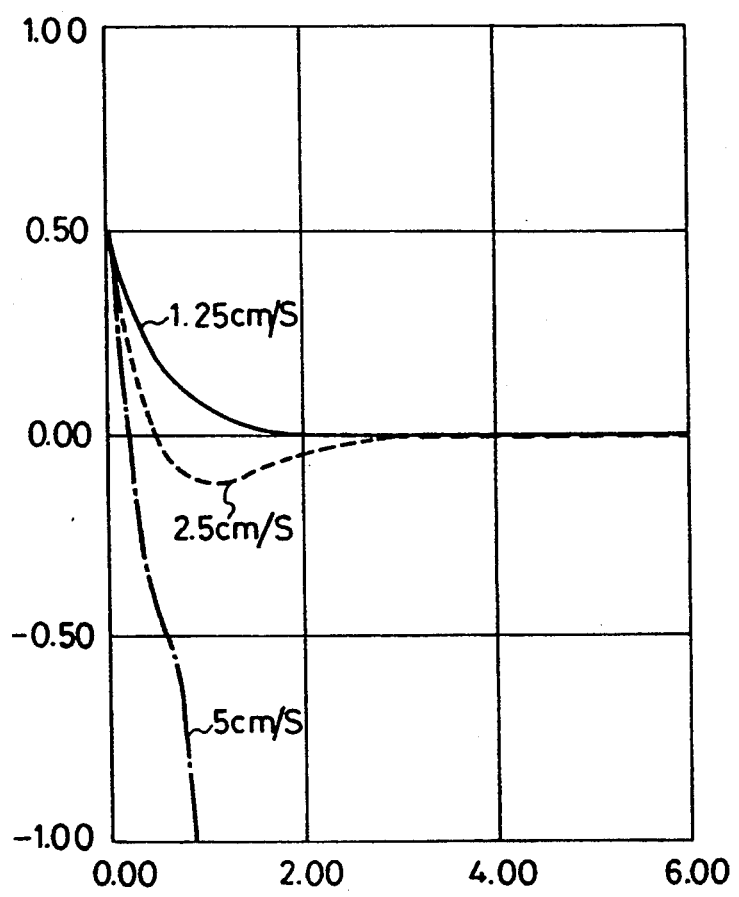
FIGS. 10(a) and 10(b) are charts of settling times and a track pitch in the case of the dynamic range of $\pm\frac{1}{2}$ tracks and the dynamic range of $\pm 6$ tracks, respectively.
Figure 10B:
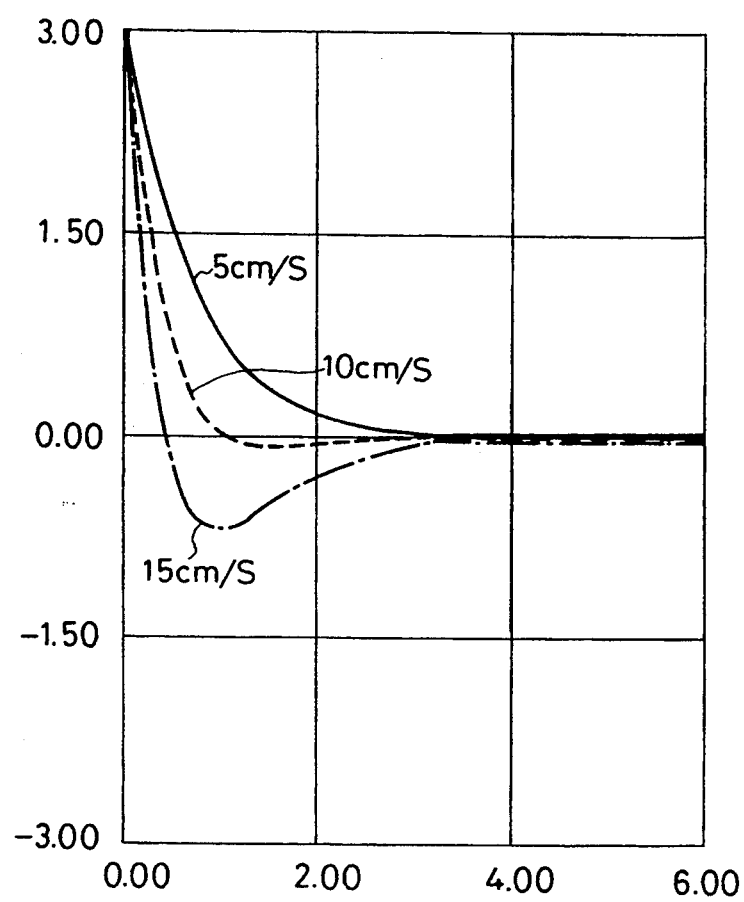

FIG. 10(a) is the diagram of a settling time of the head in the prior art, and FIG. 10(b) is the diagram of a settling time of the head in the present invention. In these diagrams, ordinates designate track pitch, and the track pitch graduated at the starting point of each curve represents the rush position of the head. These parameters are rush velocity or the head (1.25 cm/s, 2.5 cm/s, 5 cm/s, 10 cm/s or 15 cm/s). These diagrams show the expanded position signal in the resolution of $1/(2^7)$ of the information track width based on a sufficiently short sampling time.

In FIG. 10(a), the dynamic range of the position signal is about ±½ tracks, and the control mode is changed from the velocity control mode to the tracing control mode before ½ tracks of the target track. In cases of 1.25 m/s and 2.5 cm/s of rush velocity, the head is settled to the target track within 3 ms, though there is an overshoot on the travel thereof. In case of 5 cm/s of rush velocity, the head is not settled to the target track in the given dynamic range of the position signal because of an excessive rush velocity. Thus the head falls in seek error.

In FIG. 10(b), the dynamic range of the position signal is about ±6 tracks, and the control mode is changed from the velocity control mode to the tracing control mode before 3 tracks of the target track. In cases of 5 cm/s rush velocity, the head is settled to the target track, though there is a slight undershoot on the travel thereof. In case of 15 cm/s, the head is settled to the target track with a slight overshoot on the travel thereof. In case of 10 cm/s, the head is satisfactorily settled to the target track. As shown in FIG. 10(b), the head can be rushed to the target track with such a high velocity by using the expanded position signal, and a high velocity access of the head is realizable. Moreover, even if the rush velocity deviates from a predetermined value, the data ahead is safely settled to the target track, and reliability in seek operation is improved.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be Interpreted as covering all alterations and modifications as fall within the true spirit and scope of the invention.

What is claimed is:

1. Method for generating head positioning signal comprising the steps of:
    discretely forming servo patterns in circular direction of a rotatable recording medium, said servo pattern comprising at least two sub-servo-patterns having the periodic interval of the width of M tracks (M is an integer of 2 or more), peak values of reproduced signal amplitudes of the above-mentioned respective sub-servo-patterns are compared respectively thereby to form a first binary-valued information, subsequently adding a first offset onto, at least, one of those peak values of the aforementioned reproduced signal amplitude in compliance with a value of said first binary-valued information, then comparing respective peak values to each other again thereby to form a second binary-valued information, further adding a second offset onto a peak value on which said first offset was added in compliance with a value of the second binary-valued information, or further adding a different offset from the first offset onto a peak value on which no offset was added at the time when second binary-valued information was produced, then comparing respective peak values to each other again, thereby to form a third binary-valued information, then repeating the above-mentioned steps at least N times (N is an integer), thereby to recognize the head position In the radial direction of a recording medium up to a precision of $1/(2^N)$ of the information track width, generating a head positioning signal in compliance with a distance from a head to a target track for positioning said head to said target track, and generating an expanded position signal having a dynamic range of the interval of the width of said tracks in periodic interval of said M tracks.

2. Apparatus for generating a head positioning signal comprising:

head position information recognition apparatus comprising:

at least two peak holders for holding peak values of reproduced signal amplitudes of respective sub-servo-patterns having a periodic interval of the width of M tracks (M is an integer of 2 or more) formed in a servo pattern formed discretely in the circular direction of a rotatable recording medium, at least one comparator for comparing said at least two peak values, a first latch for memorizing the output of said comparator, thereby to hold a first binary-valued information, an offset decoder for determining to which peak holder an offset is to be added in compliance with the contents of said first latch, an offset-adder for adding an offset to a specified peak holder in compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using said comparator again, N latches for latching N binary-valued informations from 1st to N-th binary-valued information, and a head position information discrimination element for detecting the relative position relation of a head with respect to tracks with a precision up to $1/(2^N)$ of the information track width by using contents of said from the 1st latch to the N-th latch, and a central processing means (μCPU) for generating an expanded position signal having a dynamic range of the interval of the width of M tracks in periodic interval of said M tracks, by computing a relative distance in radial direction of a rotatable recording medium between a head and a predetermined track up to a precision of $1/(2^N)$ of a track width.

3. Apparatus for head positioning comprising:

a head for reproducing information of servo-patterns formed discretely in circular direction of a rotatable recording medium, a servo information demodulator for taking out the servo Information included in said discrete servo-patterns out of reproduced signal from said head, head positioning signal generating apparatus comprising:

head position information recognition apparatus comprising:

at least two peak holders for holding peak values of reproduced signal amplitudes of respective sub-servo-patterns having a periodic interval of the width of M tracks (M is an Integer of 2 or more) formed in a servo pattern formed discretely in the circular direction of a rotatable recording medium, at least one comparator for comparing said at least two peak values, a first latch for memorizing the output of said comparator, thereby to hold a first binary-valued information, an offset decoder for determining to which peak holder an offset is to be added in compliance with the contents of said first latch, an offset-adder for adding an offset to a specified peak holder in compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using said comparator again, N latches for latching N binary-valued informations from 1st to N-th binary-valued information, and a head position information discrimination element for detecting the relative position relation of a head with respect to tracks with a precision up to $1/(2^N)$ of the information track width by using contents of said from the 1st latch to the N-th latch, and a central processing means (μCPU) for generating an expanded position signal having a dynamic range of the interval of the width of M tracks in periodic interval of said M tracks, by computing a relative distance In radial direction of a rotatable recording medium between a head and a predetermined track up to a precision of $1/(2^N)$ of a track width, velocity instruction means for issuing track access velocity instruction in compliance with the distance to a target track based on the output of said head positioning signal generating apparatus, velocity recognition means for acquiring a moving velocity of the head in the radial direction of the recording medium, positioning means for moving the head to an arbitrary position in the radial direction of said recording medium, by feeding back a signal based on the output of said head positioning signal generating apparatus in track tracing control and a signal based on a velocity error between the output of said velocity instruction means and the output of said velocity recognition means in track access control to said positioning means.

* * * * *